US012715506B2

(12) United States Patent
Zimmerman et al.

(10) Patent No.: US 12,715,506 B2
(45) Date of Patent: Aug. 25, 2026

(54) SYSTEMS AND METHODS TO COMPENSATE FOR A STEERING PINION OFFSET

(71) Applicant: Ford Global Technologies, LLC, Dearborn, MI (US)

(72) Inventors: Jon Zimmerman, Ferndale, MI (US); Meghna Menon, Ypsilanti, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 18/647,908

(22) Filed: Apr. 26, 2024

(65) Prior Publication Data

US 2025/0333102 A1 Oct. 30, 2025

(51) Int. Cl.
*B62D 6/00* (2006.01)

(52) U.S. Cl.
CPC .................................... *B62D 6/005* (2013.01)

(58) Field of Classification Search
CPC ...................................................... B62D 6/005
USPC ............................................................ 701/41
See application file for complete search history.

(56) References Cited

U.S. PATENT DOCUMENTS

| | | | | |
|---|---|---|---|---|
| 5,948,030 | A | 9/1999 | Miller et al. | |
| 9,205,869 | B2 | 12/2015 | Turner | |
| 2023/0001915 | A1* | 1/2023 | Bosse | B60W 30/045 |
| 2023/0145508 | A1 | 5/2023 | Kaphengst et al. | |
| 2024/0182016 | A1 | 6/2024 | Santillo et al. | |
| 2024/0182112 | A1 | 6/2024 | Menon et al. | |
| 2025/0222975 | A1* | 7/2025 | Itazuri | B62D 15/0245 |

FOREIGN PATENT DOCUMENTS

| | | |
|---|---|---|
| KR | 102506647 | 3/2023 |

* cited by examiner

*Primary Examiner* — Scott A Reinbold
(74) *Attorney, Agent, or Firm* — Burris Law, PLLC

(57) ABSTRACT

A method including the receipt of a first steering request corresponding to a desired steering angle of a vehicle, the determination of an actual steering angle of the vehicle based on steering data associated with a yaw rate sensor of the vehicle, the comparison of the desired steering angle to the actual steering angle to determine a steering angle difference, and the receipt of a second steering request wherein the second steering request includes an updated compensation value corresponding to the steering pinion offset to adjust the steering angle of the vehicle based on the comparison to reduce the steering angle difference.

20 Claims, 8 Drawing Sheets

SYSTEMS AND METHODS TO COMPENSATE FOR A STEERING PINION OFFSET

FIELD

The present disclosure relates to providing compensation to a steering pinion associated with a vehicle. More specifically, the compensation is applied to the steering pinion to aid in marshaling the vehicle.

BACKGROUND

The statements in this section merely provide background information related to the present disclosure and may not constitute prior art.

Marshaled vehicles that arrive at the end of a line associated with a manufacturing process typically require immediate steering calibration so that the vehicle may travel from the last assembly-related workstation to the alignment workstation. However, such an arrangement for marshaling the vehicles between the last assembly-related workstation to the alignment workstation relies on either infrastructure-guided instructions and/or a human porter that is responsible for physically driving the vehicle to the alignment workstation.

The present disclosure addresses the marshaling of the vehicles in one or more novel methods and/or systems described herein.

SUMMARY

This section provides a general summary of the disclosure and is not a comprehensive disclosure of its full scope or all of its features.

The present disclosure provides a method for adjusting a steering pinion offset associated with a vehicle, the method comprising: receiving, at the vehicle, a first steering request corresponding to a desired steering angle of the vehicle; determining, by an algorithm associated with the vehicle, an actual steering angle of the vehicle based on steering data associated with a yaw rate sensor of the vehicle; comparing the desired steering angle to the actual steering angle to determine a steering angle difference; and receiving a second steering request at the vehicle, wherein the second steering request includes an updated compensation value corresponding to the steering pinion offset to adjust the steering angle of the vehicle based on the comparison to reduce the steering angle difference; further comprising: receiving a third steering request at the vehicle, wherein the third steering request includes a compensation value to further adjust the steering angle of the vehicle based on comparing the desired steering angle to the adjusted steering angle to determine the steering angle difference; wherein the compensation value included in the third steering request corresponds to a total compensation value; further comprising: determining, by the algorithm, the total compensation value based on the compensation value included in the second steering request, the compensation value included in the third steering request, and a velocity associated with the vehicle; further comprising; filtering the steering angle difference by storing the steering angle difference in a rolling weighted average, generating a recursive least squares value based on a velocity associated with the vehicle, or a combination thereof; wherein a vehicle system associated with the vehicle is configured to receive a plurality of steering requests, wherein the plurality of steering requests includes the first steering request, the second steering request, and a third steering request, wherein a steering angle of the third steering request corresponds to the desired steering angle of the vehicle; and further comprising: calibrating, by the algorithm, the yaw rate sensor associated with the vehicle based on a static offset of the yaw rate sensor.

The present disclosure also provides a system for adjusting a steering pinion offset associated with a vehicle, the system comprising: an algorithm associated with the vehicle configured to: determine an actual steering angle of the vehicle based on steering data associated with a yaw rate sensor of the vehicle, and compare a desired steering angle of the vehicle to the actual steering angle to determine a steering angle difference; a vehicle system associated with the vehicle configured to: receive a first steering request corresponding to the desired steering angle, and receive a second steering request, wherein the second steering request includes an updated compensation value corresponding to the steering pinion offset to adjust the steering angle of the vehicle based on the comparison to reduce the steering angle difference; and a perception system associated with the vehicle configured to: transmit the first steering request and the second steering request to the vehicle system; wherein the vehicle system is further configured to: receive a third steering request at the vehicle, wherein the third steering request includes a compensation value to further adjust the steering angle of the vehicle based on comparing the desired steering angle to the adjusted steering angle to determine the steering angle difference; wherein the compensation value included in the third steering request corresponds to a total compensation value; wherein the algorithm is further configured to: determine the total compensation value based on the compensation value included in the second steering request, the compensation value included in the third steering request, and a velocity associated with the vehicle; wherein the algorithm is further configured to: filter the steering angle difference by storing the steering angle difference in a rolling weighted average, generating a recursive least squares value based on a velocity associated with the vehicle, or a combination thereof; wherein the vehicle system associated with the vehicle is configured to receive a plurality of steering requests, wherein the plurality of steering requests includes the first steering request, the second steering request, and a third steering request, wherein a steering angle of the third steering request corresponds to the desired steering angle of the vehicle; and wherein the algorithm is further configured to: calibrate the yaw rate sensor associated with the vehicle based on a static offset of the yaw rate sensor.

The present disclosure further provides one or more non-transitory computer-readable media storing processor-executable instructions that, when executed by at least one processor, cause the at least one processor to: receive, at a vehicle, a first steering request corresponding to a desired steering angle of the vehicle; determine, by an algorithm associated with the vehicle, an actual steering angle of the vehicle based on steering data associated with a yaw rate sensor of the vehicle; compare the desired steering angle to the actual steering angle to determine a steering angle difference; and receive a second steering request at the vehicle, wherein the second steering request includes an updated compensation value corresponding to a steering pinion offset associated with a vehicle to adjust the steering angle of the vehicle based on the comparison to reduce the steering angle difference; wherein the at least one processor is further caused to: receive a third steering request at the vehicle, wherein the third steering request includes a compensation value to further adjust the steering angle of the vehicle based on comparing the desired steering angle to the adjusted steering angle to determine the steering angle difference, and wherein the compensation value included in the third steering request corresponds to a total compensation value; wherein the at least one processor is further caused to: determine, by the algorithm, the total compensation value based on the compensation value included in the second steering request, the compensation value included in the third steering request, and a velocity associated with the vehicle; wherein the at least one processor is further caused to: filter the steering angle difference by storing the steering angle difference in a rolling weighted average, generating a recursive least squares value based on a velocity associated with the vehicle, or a combination thereof; wherein a vehicle system associated with the vehicle is configured to receive a plurality of steering requests, wherein the plurality of steering requests includes the first steering request, the second steering request, and a third steering request, wherein a steering angle of the third steering request corresponds to the desired steering angle of the vehicle; and wherein the at least one processor is further caused to: calibrate, by the algorithm, the yaw rate sensor associated with the vehicle based on a static offset of the yaw rate sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
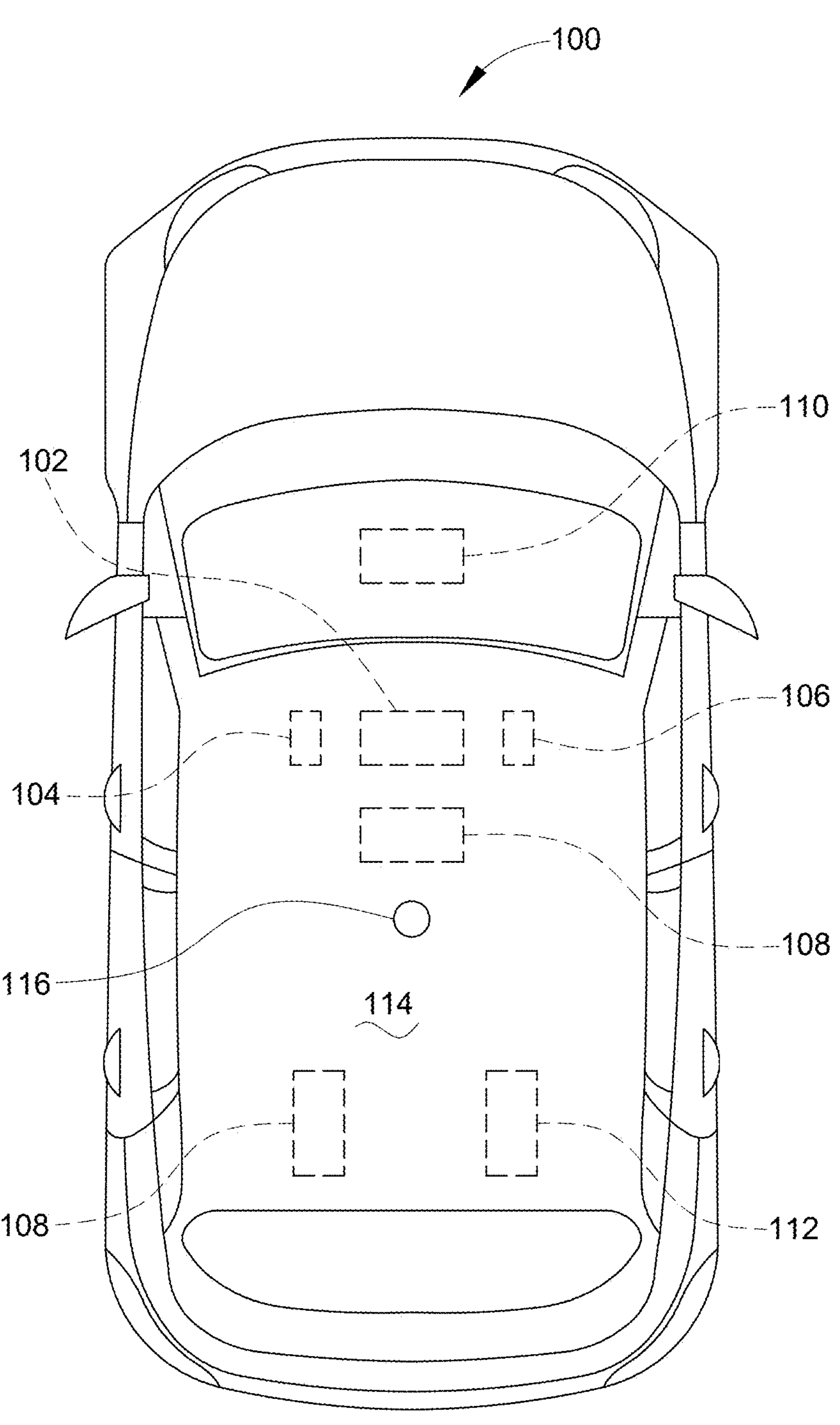
FIG. 1 illustrates an example vehicle, and associated system therein, in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure, in various examples, provides a system allowing for a coarse estimate of a vehicle's steering angle upon installation of the tires by leveraging the on-board ray yaw rate sensor for calibration prior to full calibration at a wheel-alignment-headlamp-aim workstation (WAHA). By using the vehicle's yaw rate sensor and the below-described algorithm, the vehicle is able to determine an appropriate steering wheel compensation before reaching the calibration workstation (e.g., the WAHA workstation).

Referring now to FIG. 1, there is shown a vehicle 100 and associated system therein. It is understood that the vehicle 100 can be powered in a variety of ways, for example, with an electric motor and/or an internal combustion engine. It is also understood that the vehicle 100 may be any type of vehicle powered by powered by an electric motor and/or an internal combustion engine such as a car, a truck, a robot, a plane, and/or a boat, as non-limiting examples. It is additionally understood that the vehicle 100 can be an autonomous vehicle, a semi-autonomous vehicle, or a manually operated vehicle. While the vehicle 100 can be an autonomous vehicle, a semi-autonomous vehicle, or a manually operated vehicle, it is further understood that the vehicle 100 can be operated in any manner.

The vehicle 100 includes a vehicle controller 102, one or more actuators 104, a plurality of on-board sensors 106, an offset determination model 108, a human machine interface (HMI) 110, a perception system 112, and a vehicle system 114. The vehicle 100 also has a reference point 116, that is, a specified point within the space defined by a vehicle body, for example, a geometrical center point at which respective longitudinal and lateral center axes of the vehicle 100 intersect. The reference point 116 identifies the location of the vehicle 100, for example, a point at which the vehicle 100 is located as the vehicle 100 navigates toward a waypoint.

The vehicle controller 102, in some examples, is configured or programmed to control the operation of the vehicle's 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle controller 102, as opposed to a human operator, is to control such operations. It is understood that any of the operations associated with the vehicles 100 may be facilitated via an automated, a semi-automated, or a manual mode. For example, the automated mode may facilitate for any of the operations to be fully controlled by the vehicle controller 102 without the aid of a user. As another example, the semi-automated mode may facilitate for any of the operations to be at least partially controlled by the vehicle controller 102 and/or the user. As a further example, the manual mode may facilitate for any of the operations to be fully controlled by the user.

The vehicle controller 102 includes or may be communicatively coupled to (e.g., via a vehicle communications controller area network (CAN)) one or more processors, for example, controllers or the like included in the vehicle 100 for monitoring and/or controlling various vehicle controllers, such as a powertrain controller, a brake controller, a steering controller, etc. The vehicle controller 102 is generally arranged for communication on a vehicle communication network that can include a bus in the vehicle 100 such as a CAN or the like, and/or other wired and/or wireless mechanisms.

The vehicle controller 102 transmits messages, via a vehicle network, to various devices in the vehicle 100 and/or receives messages from the various devices, for example, the one or more actuators 104, the HMI 110, etc. Alternatively, or additionally, in cases where the vehicle controller 102 includes multiple devices, the vehicle communication network is utilized for communications between devices represented as the vehicle controller 102 in this disclosure. Further, as discussed below, various other controllers and/or sensors provide data to the vehicle controller 102 via the vehicle communication network.

In addition, the vehicle controller 102 is configured for communicating through a wireless vehicular communication interface with other traffic objects (e.g., vehicles, infrastructures, etc.), such as, via a vehicle-to-vehicle communication network. The vehicle controller 102 is also configured for communicating through a vehicle-to-infrastructure communication network, such as communicating with an infrastructure controller (not shown) of an infrastructure system (not shown). The vehicular communication network represents one or more mechanisms by which the vehicle controller 102 of the vehicle 100 communicates with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 104 are implemented via circuits, semiconductor chips, or other electronic and/or mechanical components that can actuate various vehicle subsystems in accordance with appropriate control signals. The vehicle actuators 104 may be used to control braking, acceleration, and/or steering of the vehicles 100. The vehicle controller 102 can be programmed to actuate the vehicle actuators 104 including propulsion, steering, and/or braking based on the planned acceleration or deceleration of the vehicles 100.

The on-board sensors 106 include a variety of devices to provide data to the vehicle controller 102. For example, the on-board sensors 106 may include object detection sensors such as lidar sensor(s) disposed on or in the vehicle 100 that provides relative locations, sizes, and shapes of one or more targets surrounding the vehicle 100, for example, additional vehicles, bicycles, robots, drones, etc., travelling next to, ahead, and/or behind the vehicle 100. As another example, one or more of the on-board sensors 106 can be radar sensors affixed to one or more bumpers of the vehicle 100 that may provide locations of the target(s) relative to the location of vehicle 100.

The object detection sensors may include a camera sensor, for example, to provide a front view, side view, rear view, etc., providing images from an area surrounding the vehicle 100. For example, the vehicle controller 102 may be programmed to receive sensor data from a camera sensor(s) and to implement image processing techniques to detect a road, infrastructure elements, etc. The vehicle controller 102 may be further programmed to determine a current vehicle location based on location coordinates, for example, GPS coordinates, received from the vehicle 100 and indicative of a location of the vehicle 100 from a GPS sensor.

The on-board sensors 106 also includes a yaw rate sensor that is configured to measure an angular velocity of the vehicle 100 about its vertical axis. For example, by measuring the angular velocity of the vehicle 100, the yaw rate sensor is able to determine an orientation and/or direction-of-travel of the vehicle 100. As another example, the vehicle controller 102 may be further programmed to compare the vehicle's 100 actual yaw rate to a target yaw rate to identify a steering offset of the vehicle 100. It is understood that the yaw rate sensor is also known as a rotation speed sensor, for example.

The offset determination model 108 is configured to facilitate the provision of a compensatory adjustment (e.g., from the vehicle controller 102) to a steering pinion (not shown) of the vehicle 100. For example, the adjustment is initiated in an instance wherein the steering offset is identified. As another example, the vehicle control 102 may additionally be programmed to repeatedly provide the steering offset to the steering pinion as the vehicle 100 traverses an area (e.g., a manufacturing facility or a parking lot).

The HMI 110 is configured to receive information from a user, such as a human operator, during operation of the vehicle 100, Moreover, the HMI 110 is configured to present information to the user, such as, an occupant of the vehicle 100, In some variations, the vehicle controller 102 is programmed to receive destination data, for example, location coordinates, from the HMI 110.

The perception system 112 is configured to process and/or interpret sensor data obtained by the plurality of on-board sensors 106 to detect, identify, classify, and/or track relative locations, sizes, and shapes of the one or more targets surrounding the vehicle 100, for example, additional vehicles, bicycles, robots, drones, etc., travelling next to, ahead, and/or behind the vehicle 100. The perception system 112 is further configured to develop a three-dimensional model of the surroundings of the vehicle 100 in consideration of the road, infrastructure elements, etc. and based on the sensor data obtained by the plurality of on-board sensors 106. Additionally, the perception system 112 is also configured to analyze a lane traveled upon by the vehicle 100 as well as initiate self-positioning and other autonomous driving modes relative to operation of the vehicle.

The vehicle system 114 is configured to control each of the subsystems within the vehicle 100 and facilitate requests across each of the above-described components (e.g., the vehicle controller 102, the one or more actuators 104, the plurality of on-board sensors 106, the offset determination model 108, the HMI 110, and/or the perception system 112).

Accordingly, the vehicle 100 can be autonomously guided toward a waypoint using at least the on-board sensors 106. Routing can be performed using vehicle location, distance to travel, queue in line for vehicle marshaling, etc. In a case wherein the vehicle 100 requires additional charge/fuel, the vehicle 100 can be prepped ahead of joining the queue.

Figure 2:
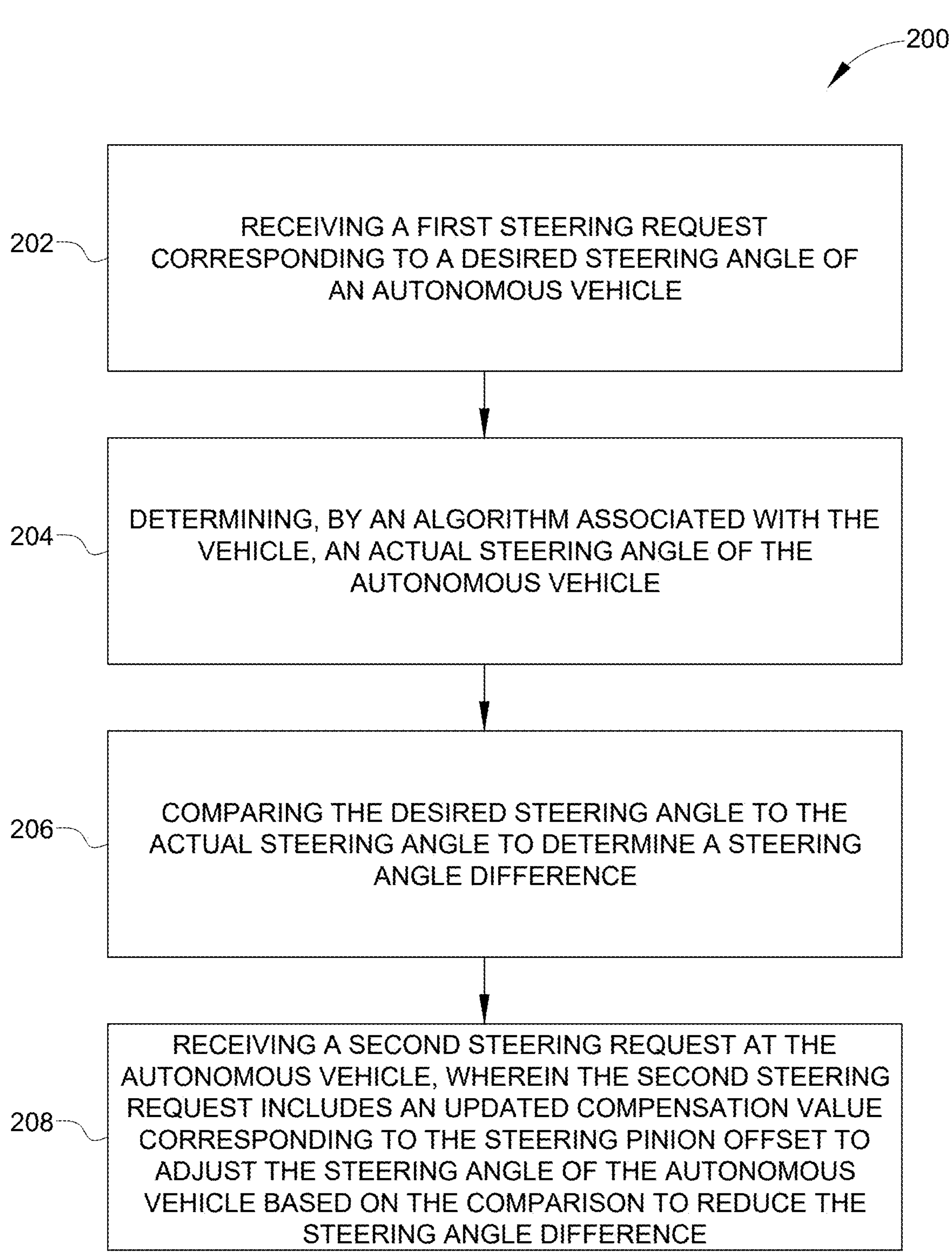
FIG. 2 is a flowchart illustrating an example method for generating a compensatory adjustment to a steering pinion offset in accordance with various implementations.

FIG. 2 is a flowchart illustrating an example method 200 for generating a compensatory adjustment to a steering pinion offset associated with a vehicle (e.g., the vehicle 100). In general, the example method 200 uses a yaw rate sensor and/or known kinematic parameters to calculate how the vehicle is actually turning so that a comparison can be made relative to a desired behavior. In an instance wherein the vehicle arrives at the end-of-line associated with a manufacturing facility, for example, a perception system (e.g., the perception system 112) can provide a request to the vehicle to control the vehicle's steering angle. As another example, using a difference in the request and the steering angle that actually occurs or results (e.g., the calculated value from the yaw rate sensor), an algorithm (e.g., the offset determination model 108) is able to determine how far from a target turning behavior (e.g., turning angle) the vehicle is and add compensation to the requested command to cause the vehicle steering angle to be corrected (e.g., correct the turning behavior). As a further example, to accomplish this, the algorithm determines a static offset of the yaw rate sensor to ultimately calibrate the yaw rate sensor, calculates the road wheel angle based on the yaw rate sensor, compares the road wheel angle to the requested steering angle of the vehicle, then saves the resultant value of the comparison in a rolling weighted average or other means of filtering (e.g., recursive least squares using velocity as a weight). Such a process is used because higher velocities associated with the vehicle can increase the accuracy of the yaw rate sensor. As yet another example, the algorithm can apply the calculated compensation to the requested steering input on each loop cycle during automated control. An advantage of this process is that the appropriate steering wheel compensation is determined, by the vehicle, before reaching a calibration station based on the yaw rate sensor and the algorithm.

At operation 202, a first steering request is received at the vehicle. For example, the first steering request can correspond to a desired steering angle of the vehicle. As another example, the desired steering angle can correspond to an angle by which the vehicle must travel to arrive at a target destination. At operation 204, an actual steering angle associated with the vehicle is determined. For example, the actual steering angle is determined by the algorithm associated with the vehicle. As another example, the actual steering angle is determined based on steering data associated with a yaw rate sensor (e.g., the yaw rate sensor of the plurality of on-board sensors 106) of the vehicle.

At operation 206, the desired steering angle is compared (e.g., by the algorithm) to the actual steering angle to determine a steering angle difference. At operation 208, a second steering request is received at the vehicle. For example, the second steering request can include an updated compensation value. The second steering request can also correspond to the desired steering angle of the vehicle, wherein the second steering request can include an update to the desired steering angle of the vehicle based on the comparison, for example. As another example, the updated compensation value can also correspond to the steering pinion offset to adjust the steering angle of the vehicle. As yet another example, the adjustment to the steering angle of the vehicle is based on the comparison of the desired steering angle and the actual steering angle to reduce the steering angle difference.

In an example embodiment, a third steering request is received at the vehicle. For example, the third steering request can include a compensation value to further adjust the steering angle of the vehicle, thereby providing incremental steering angle adjustments. As another example, the adjustment to the steering of the vehicle is based on comparing the desired steering angle to the adjusted steering angle to determine the steering angle difference. As yet another example, the compensation value included in the third steering request corresponds to a total compensation value. As a further example, the total compensation value is determined by the algorithm. As an additional example, the total compensation value is determined based on the compensation value included in the second steering request, the compensation value included in the third steering request, and/or a velocity associated with the vehicle.

Figure 3:
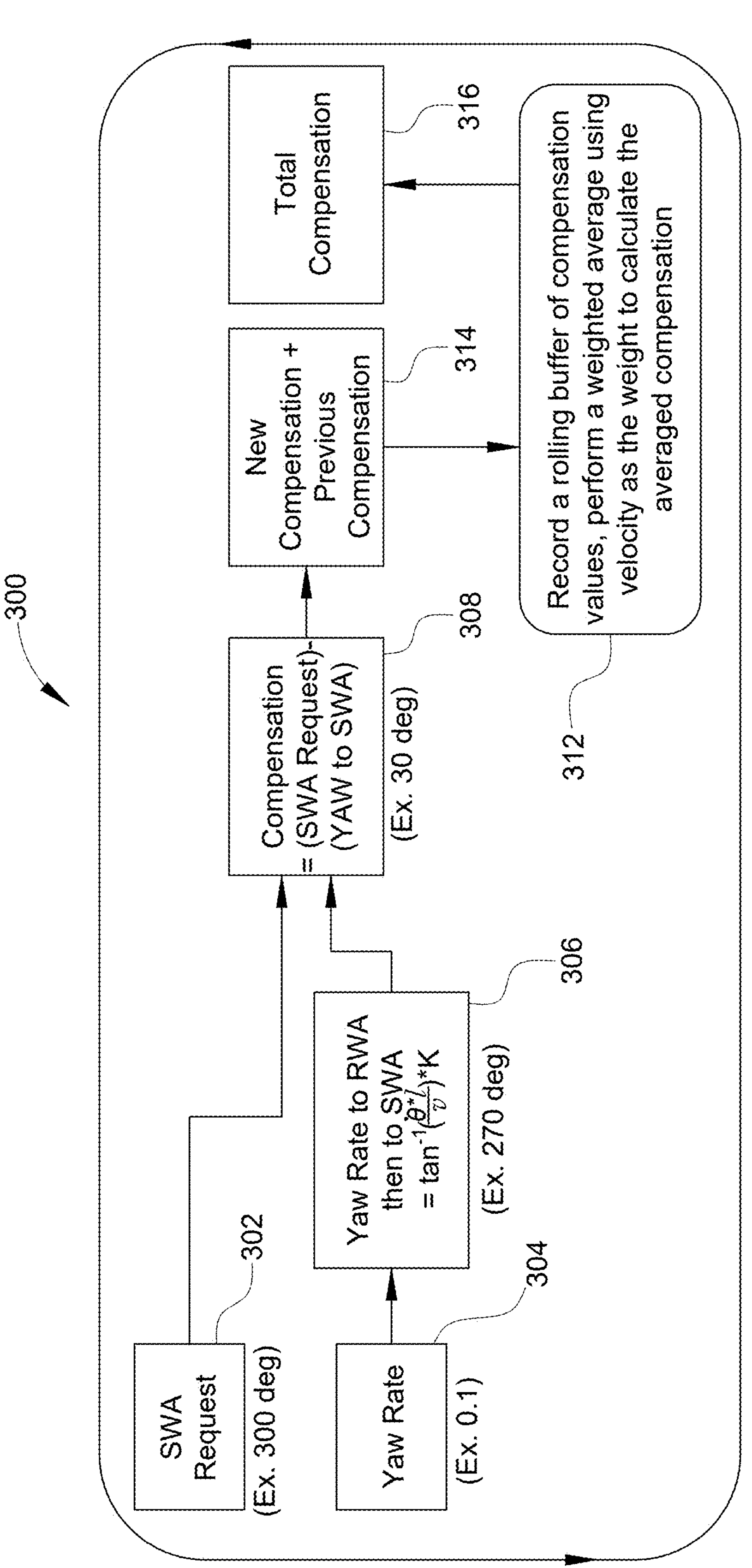
FIG. 3 illustrates a process flow associated with an algorithm for generating a steering pinion offset compensation in accordance with various implementations.

With reference to FIG. 3, a process flow 300 associated with a method that uses an offset determination model (e.g., the offset determination model 108) to determine the total compensation value. For example, a perception system (e.g., the perception system 112) of the vehicle 100 can request a steering wheel angle (SWA) at a particular point in time relative to the vehicle's 100 progression through an area (e.g., the manufacturing facility or the parking lot) at operation 302 (e.g., the SWA can be 300 degrees). It is understood that the request can include a theoretical steering angle (e.g., the desired steering angle or an expected steering angle) that corresponds to a required steering angle the vehicle 100 would have to travel to ultimately arrive at the target destination. It is also understood that the theoretical steering angle can change each time a request for the SWA is made based on the total compensation. As another example, the offset determination model can receive the yaw rate (e.g., from the yaw rate sensor) at the particular point in time relative to the vehicle's 100 progression through the area at operation 304 (e.g., the yaw rate can be 0.1 radians per second).

As a further example, the offset determination model can determine the actual steering angle of the vehicle 100 by calculating a RWA based on the yaw rate and then the SWA based on the RWA at operation 306 (e.g., the yaw rate to the SWA can be 270 degrees). As an additional example, the actual steering angle of the vehicle 100 can be calculated based on the following equation:

$$\text{Yaw Rate to } SWA = \tan^{-1}\left(\frac{\dot{\theta} * l}{v}\right) * K$$

wherein $\dot{\theta}$ is the yaw rate of the vehicle 100, l is a value associated with a wheelbase of the vehicle 100, v is the velocity of the vehicle 100, and K is a constant of variation.

At operation 308, the offset determination model 108 is configured to calculate the compensation relative to the particular request by subtracting the calculated yaw rate to the SWA from the requested steering wheel angle (e.g. the compensation can be 30 degrees). For example, the compensation relative to the particular request is calculated based on the following equation:

$$\text{Compensation} = (SWA\ \text{Request}) - (\text{YAW Rate to } SWA)$$

At operation 312, the offset determination model 108 is configured to record a rolling buffer of compensation values based on the addition of the newly calculated compensation by a previously calculated compensation (e.g., at operation 310). As an example, the recorded rolling buffer is based on a weighted average that is determined using velocity as the weight to calculate an average compensation. For example, the calculated compensation relative to the particular request can be associated with a fourth request so that the calculated compensation for the fourth request can be added to the rolling buffer of compensation values along with the first request, the second request, and the third request, each of which are used in the calculation of the average compensation described above, At operation 316, the offset determination model 108 is further configured to determine the total compensation based on the recorded rolling buffer of compensation values obtained in operation 312, for example.

Referring back to FIG. 2, and in another example embodiment, the steering angle difference is filtered. For example, the steering angle difference is filtered by storing the steering angle difference in a rolling weighted average, generating a recursive least squares value based on a velocity associated with the vehicle, or a combination thereof. In another example embodiment, a vehicle system (e.g., the vehicle system 114) associated with the vehicle is configured to receive a plurality of steering requests. For example, the plurality of steering requests can include the first steering request, the second steering request, and the third steering request. The third steering request can also correspond to the desired steering angle of the vehicle, wherein the third steering request can include an update to the desired steering angle of the vehicle based on the comparison, for example. In yet another example embodiment, the yaw rate sensor associated with the vehicle is calibrated by the algorithm. For example, the yaw rate sensor associated with the vehicle is calibrated based on a static offset of the yaw rate sensor.

Figure 4A:
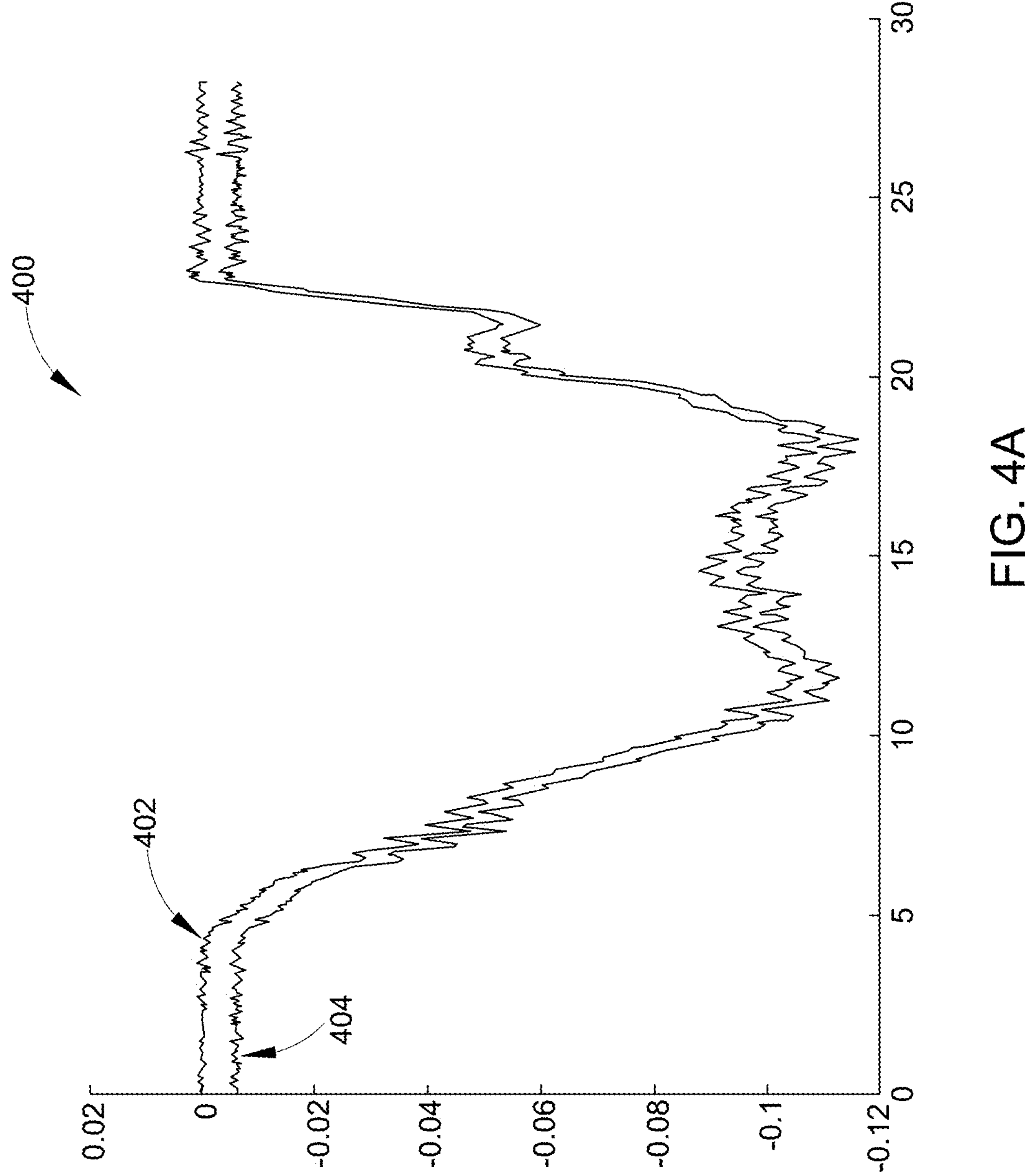
FIGS. 4A-4D are graphs depicting one or more effects the algorithm illustrated in FIG. 2 has on a steering angle offset in accordance with various implementations.

FIGS. 4A-4D represent effects of various stages of processing the offset determination initiated based on the offset determination model 108. For example, FIG. 4A depicts a plot 400 that shows the yaw rate compensation 402 provided by the offset determination model 108 before the vehicle 100 begins to move. For example, at an initialization stage, a constant yaw sensor offset (e.g., shown at line 404) is generated based on values received from the yaw sensor while the vehicle 100 is at a zero speed average. As another example, the offset determination model 108 can correct for the static offset of the yaw rate sensor and is configured to apply a varying offset based on various points in time until the vehicle 100 arrives at the target destination.

Figure 4B:
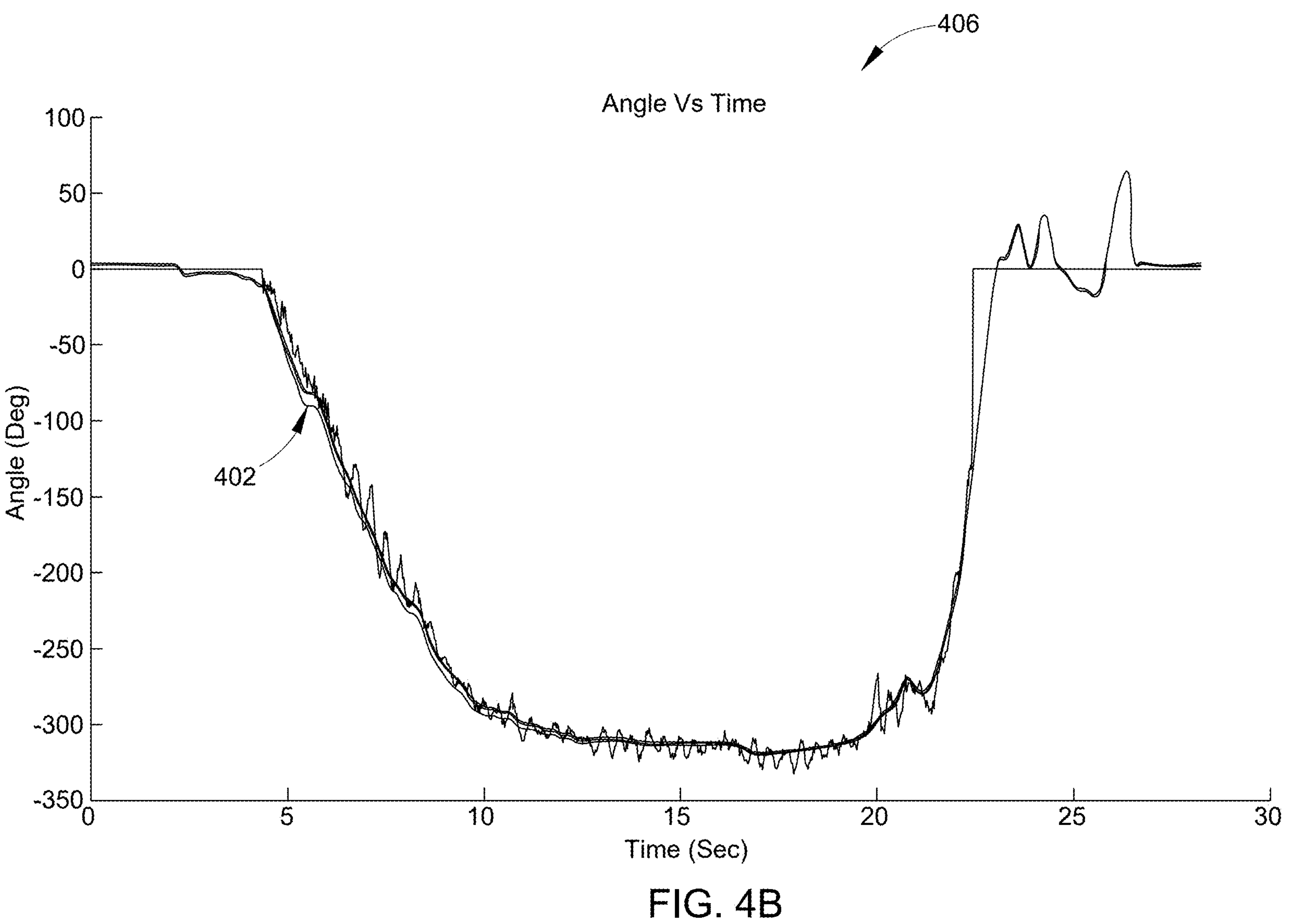
Figure 4C:
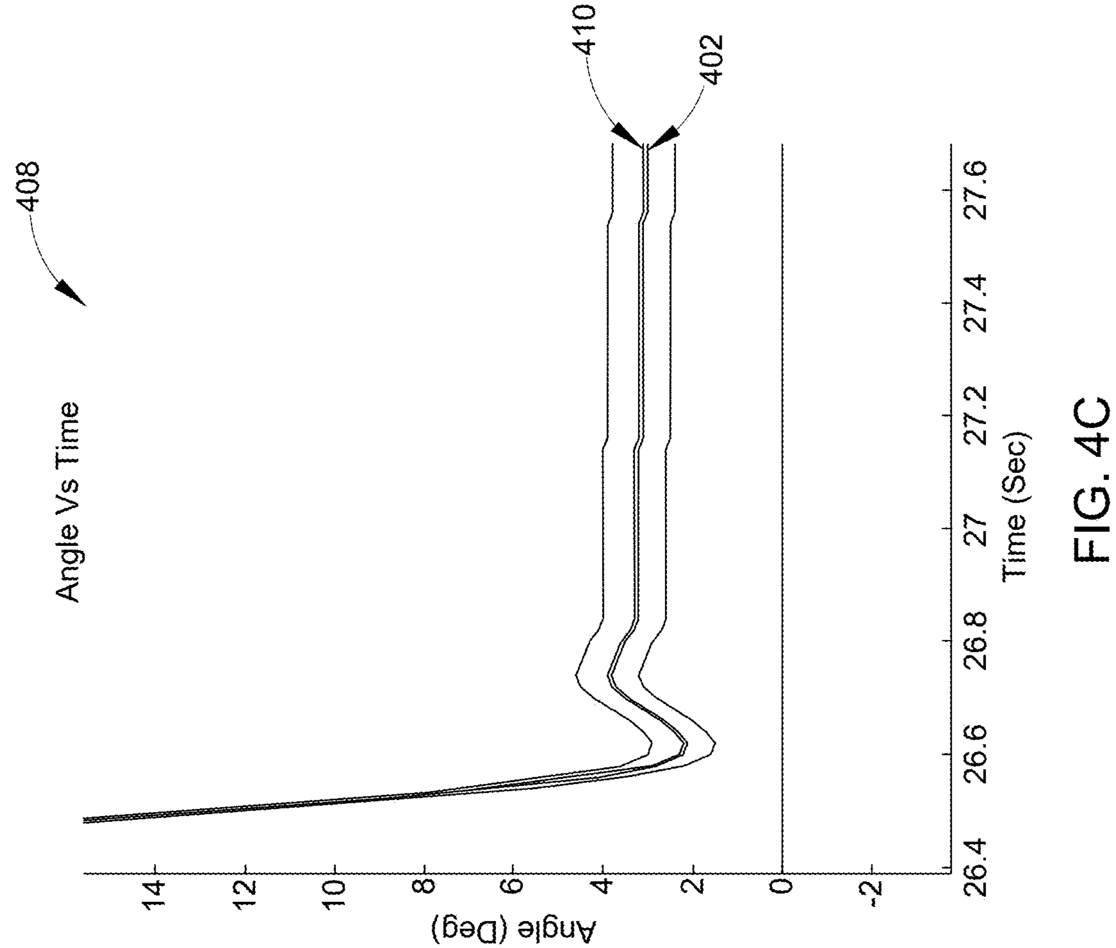
Figure 4D:
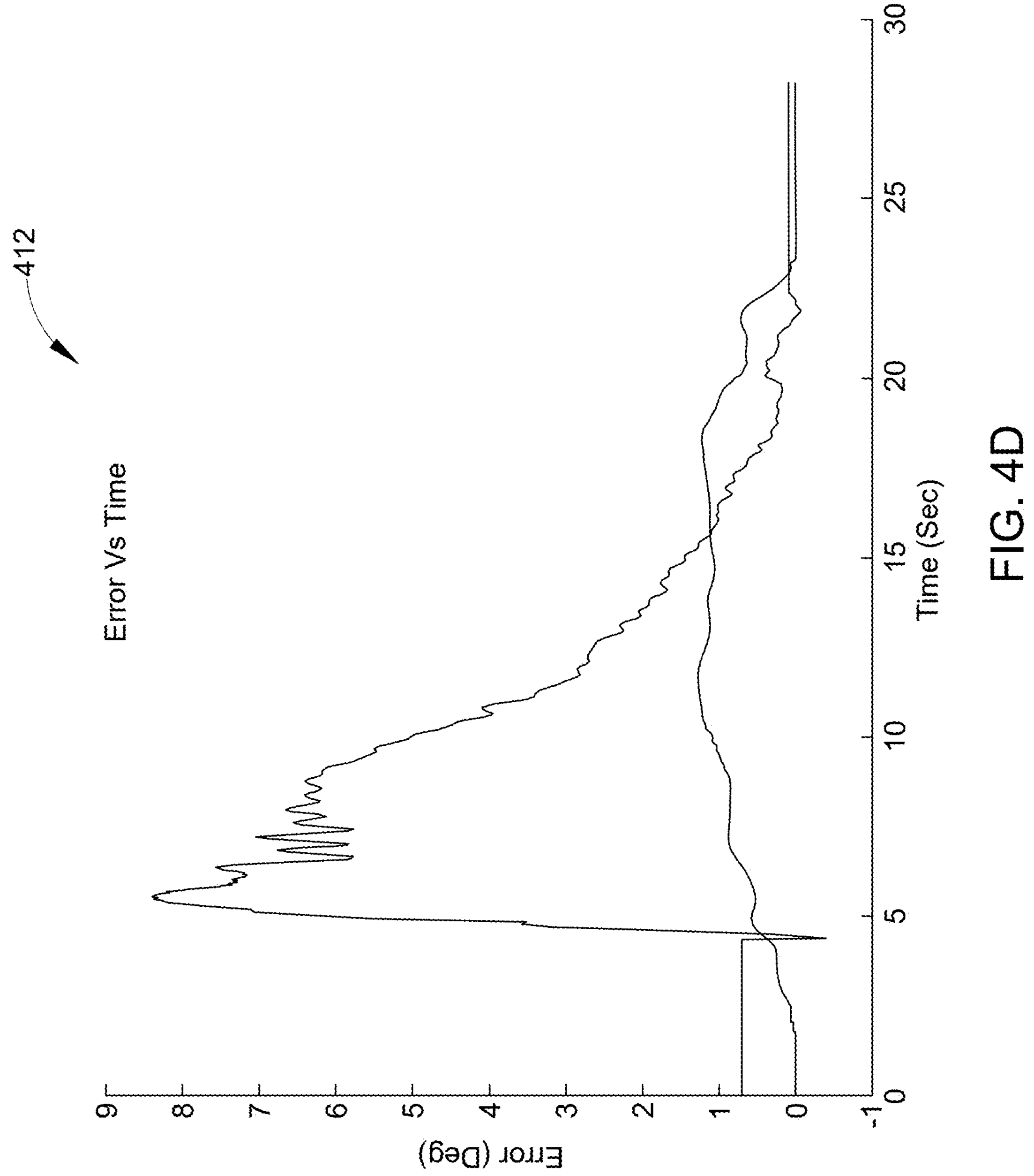

As another example, FIGS. 4B and 4C depict plots 406 and 408, respectively, that show the yaw rate compensation 402 relative to data collected on the physical vehicle 100 representative of a correctly offset value (e.g., at line 410), which is shown as ultimately similar in value to the yaw rate compensation 402. As an additional example, FIG. 4D depicts a plot 412 that shows the effect of the rolling weighted average (e.g., at a 1000 point history). More specifically, based on the rolling weighted average in consideration of higher velocities associated with the vehicle 100, noise is averaged out and therefore uncertainty can be reduced in the yaw calculated angle resulting in reduced errors after a time period (e.g., between 20 and 25 seconds).

Figure 5:
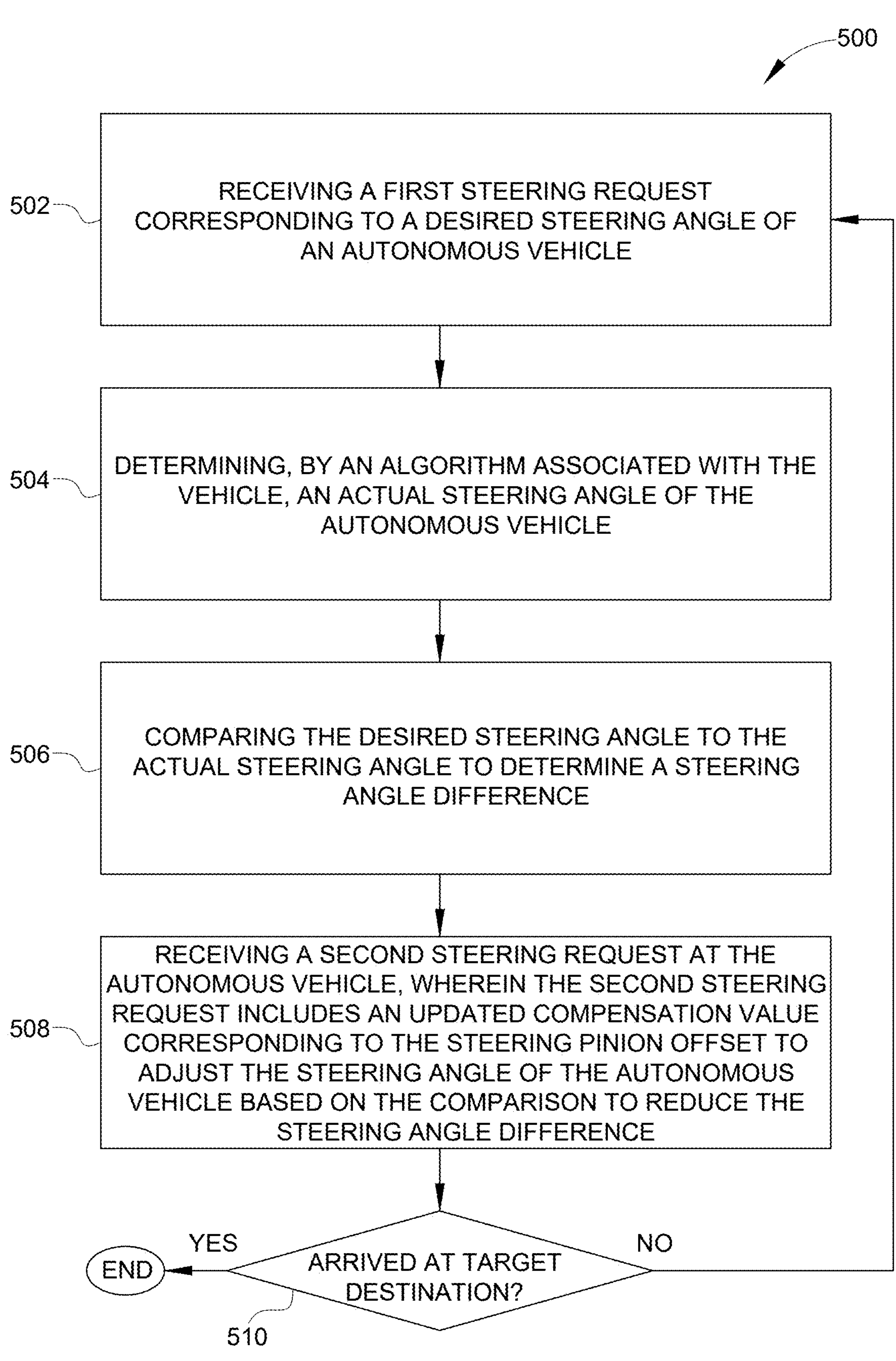
FIG. 5 is a flowchart illustrating another method for generating a compensatory adjustment to a steering pinion offset in accordance with various implementations.

FIG. 5 is a flowchart illustrating an example method 500 for generating a compensatory adjustment to a steering pinion offset associated with a vehicle (e.g., the vehicle 100). At operation 502, a first steering request is received at the vehicle. For example, the first steering request can correspond to a desired steering angle of the vehicle. As another example, the desired steering angle can correspond to an angle by which the vehicle must travel to arrive at a target destination. As an additional example, in a case wherein the example method 500 is at an initialization stage, a constant yaw sensor offset is generated based on values originating from the yaw rate sensor from the vehicle in an instance wherein the vehicle is traveling at a zero speed average.

At operation 504, an actual steering angle associated with the vehicle is determined. For example, the actual steering angle is determined by an algorithm (e.g., the offset determination model 108) associated with the vehicle. As another example, the actual steering angle is determined based on steering data associated with a yaw rate sensor (e.g., the yaw rate sensor of the plurality of on-board sensors 106) of the vehicle.

At operation 506, the desired steering angle is compared (e.g., by the algorithm) to the actual steering angle to determine a steering angle difference. At operation 508, a second steering request is received at the vehicle. The second steering request can also correspond to the desired steering angle of the vehicle, wherein the second steering request can include an update to the desired steering angle of the vehicle based on the comparison, for example. For example, the second steering request can include an updated compensation value. As another example, the updated compensation value can correspond to the steering pinion offset to adjust the steering angle of the vehicle. As yet another example, the adjustment to the steering angle of the vehicle is based on the comparison of the desired steering angle and the actual steering angle to reduce the steering angle difference.

At operation 510, a determination is made regarding whether the vehicle has arrived at the target destination. In an instance wherein the vehicle has not arrived at the target destination, the example method 500 is repeated at least from operation 502. For example, the example method 500 may be repeated (e.g., as a loop cycle) as the vehicle progresses through an area (e.g., the manufacturing facility or the parking lot). As an example, the method 500 may be repeated at any frequency as the vehicle progresses through the area. It is also understood that the adjustment to the steering angle of the vehicle may be based on historical offset values associated with the steering pinion to enhance the accuracy of the compensatory adjustment related to the vehicle's progression to the target destination. As an non-exhaustive list, processing the loop cycle can include: sensing velocity of the vehicle to measure when the vehicle has started moving, filtering values below a critical speed associate with the vehicle, calculating the vehicle steering wheel angle based on a yaw rate of the vehicle, weighting the yaw rate used in the calculation of the vehicle steering wheel angle based on the vehicle's velocity at any particular time using an average and/or recursive least squares, comparing a requested curvature from an infrastructure to enable closed loop control, utilizing a rolling counter to average out noise using the average and/or recursive least squares, or a combination thereof. In the instance wherein the vehicle has arrived at the target destination, the example method 500 ends.

Thus, one or more examples of the present disclosure provide a means for compensatory adjustment to a steering pinion associated with a vehicle. For example, the compensatory adjustment is determined based solely within the vehicle itself. More specifically, the determination of the compensatory adjustment is based on an offset determination model's interaction with on-board sensors of the vehicle (e.g., a yaw rate sensor) among other components of the vehicle. Therefore, the vehicle may be successfully marshaled to a target destination based on compensation provided to the steering pinion that adjusts the steering pinion offset.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for adjusting a steering pinion offset associated with a vehicle, the method comprising:

receiving, at the vehicle, a first steering request corresponding to a desired steering angle of the vehicle;

determining an actual steering angle of the vehicle based on steering data associated with a yaw rate sensor of the vehicle;

comparing the desired steering angle to the actual steering angle to determine a steering angle difference;

calculating a compensation value corresponding to the first steering request based on the steering angle difference;

receiving a second steering request at the vehicle, wherein the second steering request includes an updated compensation value corresponding to the second steering request and the compensation value corresponding to the first steering request;

adjusting a steering angle of the vehicle based on the updated compensation value; and marshaling the vehicle to a target destination based on the adjusted steering angle.

2. The method of claim 1, further comprising:

receiving a third steering request at the vehicle, wherein the third steering request includes a second updated compensation value to further adjust the steering angle of the vehicle based on comparing the desired steering angle to the adjusted steering angle to determine the steering angle difference.

3. The method of claim 2, wherein the second updated compensation value included in the third steering request corresponds to a total compensation value.

4. The method of claim 3, further comprising:

determining the total compensation value based on the updated compensation value included in the second steering request, the second updated compensation value included in the third steering request, and a velocity associated with the vehicle.

5. The method of claim 1, further comprising:

filtering the steering angle difference by storing the steering angle difference in a rolling weighted average, generating a recursive least squares value based on a velocity associated with the vehicle, or a combination thereof.

6. The method of claim 1, further comprising receiving a plurality of steering requests, wherein the plurality of steering requests includes the first steering request, the second steering request, and a third steering request, wherein a steering angle of the third steering request corresponds to the desired steering angle of the vehicle.

7. The method of claim 1, further comprising:

calibrating the yaw rate sensor associated with the vehicle based on a static offset of the yaw rate sensor.

8. A system for adjusting a steering pinion offset associated with a vehicle, the system comprising:

a processor associated with the vehicle configured to:

determine an actual steering angle of the vehicle based on steering data associated with a yaw rate sensor of the vehicle, and compare a desired steering angle of the vehicle to the actual steering angle to determine a steering angle difference;

receive a first steering request corresponding to the desired steering angle, calculate a compensation value corresponding to the first steering request based on the steering angle difference;

receive a second steering request, wherein the second steering request includes an updated compensation value corresponding to the second steering request and the compensation value corresponding to the first steering request;

adjust the steering angle of the vehicle based on the updated compensation value; and marshal the vehicle to a target destination based on the adjusted steering angle.

9. The system of claim 8, wherein the processor is further configured to:

receive a third steering request at the vehicle, wherein the third steering request includes a second updated compensation value to further adjust the steering angle of the vehicle based on comparing the desired steering angle to the adjusted steering angle to determine the steering angle difference.

10. The system of claim 9, wherein the second updated compensation value included in the third steering request corresponds to a total compensation value.

11. The system of claim 10, wherein the processor is further configured to:

determine the total compensation value based on the updated compensation value included in the second steering request, the second updated compensation value included in the third steering request, and a velocity associated with the vehicle.

12. The system of claim 8, wherein the processor is further configured to:

filter the steering angle difference by storing the steering angle difference in a rolling weighted average, generating a recursive least squares value based on a velocity associated with the vehicle, or a combination thereof.

13. The system of claim 8, wherein the processor is further configured to receive a plurality of steering requests, wherein the plurality of steering requests includes the first steering request, the second steering request, and a third steering request, wherein a steering angle of the third steering request corresponds to the desired steering angle of the vehicle.

14. The system of claim 8, wherein the processor is further configured to:

calibrate the yaw rate sensor associated with the vehicle based on a static offset of the yaw rate sensor.

15. One or more non-transitory computer-readable media storing processor-executable instructions that, when executed by at least one processor, cause the at least one processor to:

receive, at a vehicle, a first steering request corresponding to a desired steering angle of the vehicle;

determine an actual steering angle of the vehicle based on steering data associated with a yaw rate sensor of the vehicle;

compare the desired steering angle to the actual steering angle to determine a steering angle difference;

calculate a compensation value corresponding to the first steering request based on the steering angle difference;

receive a second steering request at the vehicle, wherein the second steering request includes an updated compensation value corresponding to the second steering request and the compensation value corresponding to the first steering request; and adjust a steering angle of the vehicle based on the updated compensation value to reduce the steering angle difference; and marshal the vehicle to a target destination based on the adjusted steering angle.

16. The one or more non-transitory computer-readable media of claim 15, wherein the at least one processor is further caused to:

receive a third steering request at the vehicle, wherein the third steering request includes a second updated compensation value to further adjust the steering angle of the vehicle based on comparing the desired steering angle to the adjusted steering angle to determine the steering angle difference, and wherein the second updated compensation value included in the third steering request corresponds to a total compensation value.

17. The one or more non-transitory computer-readable media of claim 16, wherein the at least one processor is further caused to:

determine the total compensation value based on the updated compensation value included in the second steering request, the second updated compensation value included in the third steering request, and a velocity associated with the vehicle.

18. The one or more non-transitory computer-readable media of claim 15, wherein the at least one processor is further caused to:

filter the steering angle difference by storing the steering angle difference in a rolling weighted average, generating a recursive least squares value based on a velocity associated with the vehicle, or a combination thereof.

19. The one or more non-transitory computer-readable media of claim 15, wherein the at least one processor is further configured to receive a plurality of steering requests, wherein the plurality of steering requests includes the first steering request, the second steering request, and a third steering request, wherein a steering angle of the third steering request corresponds to the desired steering angle of the vehicle.

20. The one or more non-transitory computer-readable media of claim 15, wherein the at least one processor is further caused to:

calibrate the yaw rate sensor associated with the vehicle based on a static offset of the yaw rate sensor.

* * * * *